United States Patent [19]
Ledeen et al.

[11] Patent Number: 5,708,193
[45] Date of Patent: Jan. 13, 1998

[54] SYSTEM AND METHOD FOR LOCATING RELEASE OF FLUID FROM A PIPELINE

[75] Inventors: Howard L. Ledeen, Flintridge, Calif.; Robert J. Botting; Calvin R. Hastings, both of Pittsburgh, Pa.

[73] Assignee: Caldon Company, Pittsburgh, Pa.

[21] Appl. No.: 695,707

[22] Filed: Aug. 12, 1996

Related U.S. Application Data

[63] Continuation of Ser. No. 293,062, Aug. 19, 1994, abandoned.

[51] Int. Cl.$^6$ .............................. G01N 29/04; G01M 3/24
[52] U.S. Cl. .............................. 73/40; 73/40 A; 73/597
[58] Field of Search .............................. 73/40, 592, 597, 73/598, 40.5 A

[56] References Cited

U.S. PATENT DOCUMENTS

| | | | |
|---|---|---|---|
| 4,428,237 | 1/1984 | Zeger et al. | 73/592 |
| 4,858,462 | 8/1989 | Coulter et al. | 73/40.5 A |
| 5,038,614 | 8/1991 | Bseisu et al. | 73/592 |
| 5,134,876 | 8/1992 | Robertson et al. | 73/40.5 A |
| 5,333,501 | 8/1994 | Okada et al. | 73/592 |
| 5,341,670 | 8/1994 | Brook et al. | 73/40.5 A |
| 5,361,636 | 11/1994 | Farstad et al. | 73/592 |
| 5,376,927 | 12/1994 | Kidd | 340/522 |
| 5,416,724 | 5/1995 | Savic | 364/509 |

Primary Examiner—Hezron E. Williams
Assistant Examiner—J. David Wiggins
Attorney, Agent, or Firm—Ansel M. Schwartz

[57] ABSTRACT

The present invention is a system for locating release of fluid in a pipeline. The system comprises means or mechanism for detecting a pressure wave within the fluid indicative of a release of fluid from the pipeline, such as a leak or an unauthorized offtake. The system also comprises means or mechanism for determining the location of the fluid release by creating a test pressure wave within the fluid after the detected pressure wave. The fluid can be gas or oil but is not limited thereto in that the system will work with any fluid in a pipeline. Preferably, the location determining means or mechanism comprises a mechanism for creating a test pressure wave within the fluid in the pipeline and a mechanism for detecting a reflection of the test pressure wave. The reflection detecting mechanism and the original pressure wave sensing means or mechanism can both use a pressure transducer which is in communication with signal processing and control means or mechanism, such as a computer. Pressure signals from the pressure transducer are fed into the computer where they are processed and analyzed. The computer can include a video display for displaying the pressure signals and a keyboard for interacting with the computer. Digital filtering techniques permit sensitive detection with low false alarm rate. The present invention is also a system for mapping a pipeline. The system comprises a mechanism for creating a test pressure wave within a pipeline. The system also comprises a mechanism for detecting a reflection wave of the test pressure wave. The detecting mechanism can be a pressure transducer and signal processing means or mechanism which process the pressure signal over time.

17 Claims, 5 Drawing Sheets

SYSTEM AND METHOD FOR LOCATING RELEASE OF FLUID FROM A PIPELINE

This application is a continuation of application Ser. No. 08/293,062 filed on Aug. 19, 1994, now abandoned.

FIELD OF THE INVENTION

The present invention is related in general to pipelines. More specifically, the present invention is related to a system for locating a release of fluid from a pipeline.

BACKGROUND OF THE INVENTION

It is known to transport fluids, such as crude oil, refined products and other fluids from one location to another using a pipeline. These pipelines are typically disposed underground and thus leaks and obstructions are hard to identify. There have been disclosed in the past systems for sensing and locating leaks within a pipeline. A typical system is manufactured by CRC Bethany International, Inc. of Houston, Tex. In such a leak detection system, wave profiles in the fluid characteristic of pipeline rupture are constantly monitored from each end of the pipeline with detectors. The time at which detection occurs at each of the detectors is logged. The time difference can be used to determine the location of the leak based on the speed of wave propagation in the fluid. However, such a system has disadvantages in that a plurality of detectors are needed to surround the leak.

SUMMARY OF THE INVENTION

The present invention is a system for locating release of fluid from a pipeline. The system comprises means or mechanism for detecting a pressure wave which propagates as a change of state. This propagation is a plane wave which travels at acoustic velocity within the medium within the fluid indicative of a release of fluid from the pipeline, such as a leak or an unauthorized offtake. The system also comprises means or mechanism for determining the location of the fluid release by creating a test pressure wave which propagates as a change of state. This propagation is a plane wave which travels at acoustic velocity within the medium within the fluid. The invention is also for pipeline obstructions ("stuck pig") wherein plane wave reflects from obstruction. Observation of transit time allows computation of actual distance to the discontinuity. Should this wave encounter either a change of state (leak) or a discontinuity, a reflective wave is transmitted back to the point of initial propagation. The fluid can be oil but is not limited thereto in that the system will work with any fluid in a pipeline.

Preferably, the location determining means or mechanism comprises a mechanism for creating a test pressure wave within the fluid in the pipeline and a mechanism for detecting a reflection of the test pressure wave. The reflection detecting mechanism and the original pressure wave sensing means or mechanism can both use a pressure transducer which is in communication with signal processing and control means or mechanism, such as a computer. Pressure signals from the pressure transducer are fed into the computer where they are processed and analyzed. The computer can include a video display for displaying the pressure signals and a keyboard for interacting with the computer. Digital filtering techniques permit sensitive detection with low false alarm rate.

The present invention is also a system for mapping a pipeline. Distances to fixed discontinuities, branches, bends, buckles and partially closed valves can be recorded. The system comprises a mechanism for creating a test pressure wave within a pipeline. The system also comprises a mechanism for detecting a reflection wave of the test pressure wave. The detecting mechanism can be a pressure transducer and signal processing means or mechanism which process the pressure signal over time.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
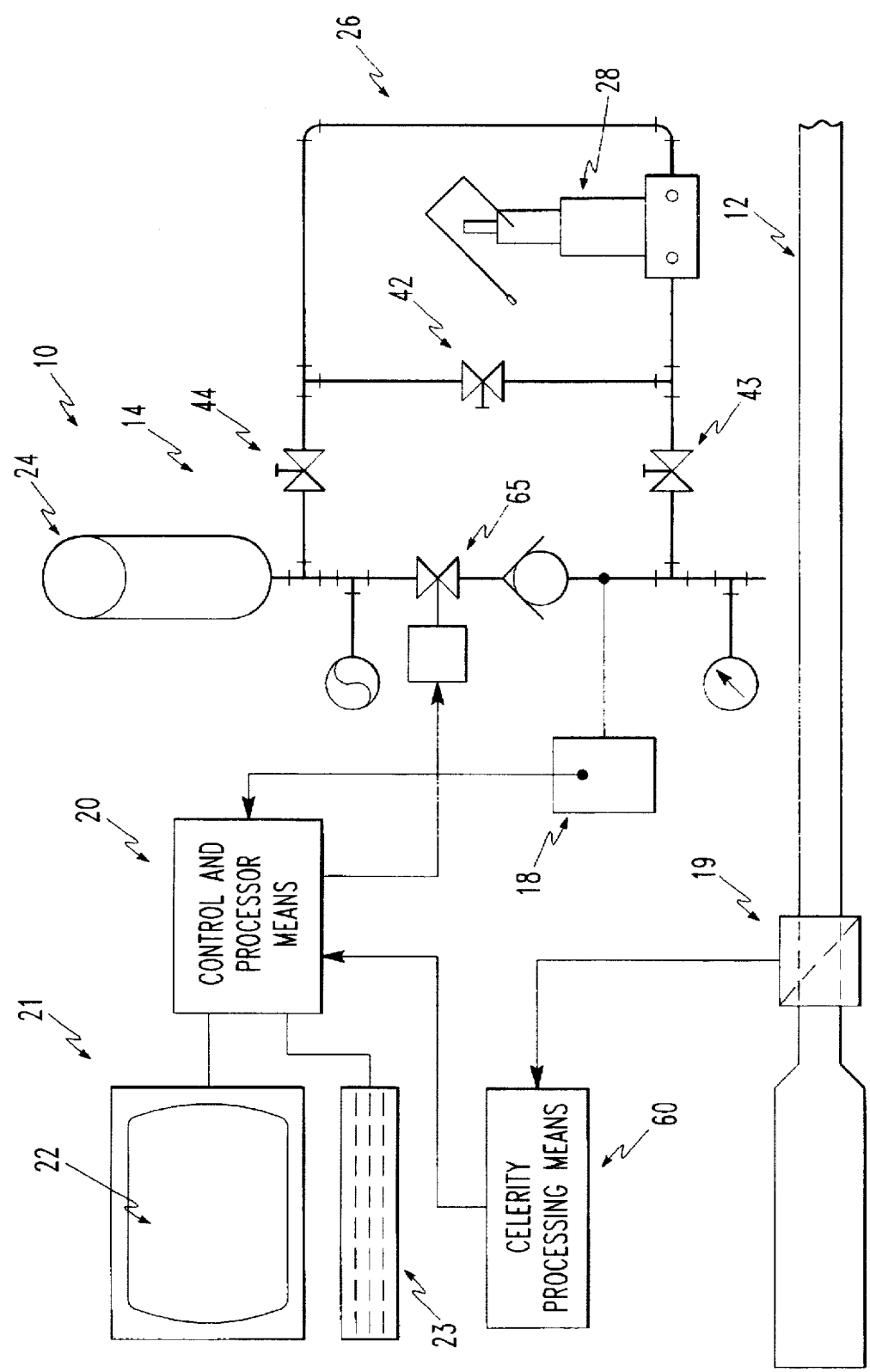
FIG. 1 is a schematic representation showing a system for locating release of fluid from a pipeline.

Referring now to the drawings wherein like reference numerals refer to similar or identical parts throughout the several views, and more specifically to FIG. 1 thereof, there is shown a system 10 for monitoring and locating release of fluid in a pipeline 12. The system 10 comprises means or mechanism for detecting a pressure wave within the fluid indicative of a release of fluid from the pipeline 12, such as a leak. The system 10 also comprises means or mechanism for determining the location of the fluid release by creating a test pressure wave within the fluid in the pipeline 12. The fluid can be gas or oil but is not limited thereto in that the system 10 will work with any fluid and preferably gas in a pipeline 12.

The sudden release of fluid from a pipeline 12 produces a discrete transient pressure drop which propagates as a plane wave along the pipeline 12 within the fluid medium. The pipeline walls act as a waveguide, with the pressure transient propagating as a wave away from the release in both directions. This wave is detected by the detecting means or mechanism, such as with a pressure transducer 18 and signal processing and control means or mechanism 20.

Preferably, the location determining means or mechanism comprises a mechanism 14 for creating a test pressure wave within the fluid in the pipeline 12. The test pressure wave can be a positive or a negative pressure wave, can be a singular wave or a plurality of waves. The location determining means or mechanism also comprises a mechanism for detecting a reflection of the test pressure wave. See U.S. patent applications Ser. No. 07/962,524, 07/962,526 and 07/962,457, incorporated by reference. The reflection detecting mechanism and the original pressure wave sensing means or mechanism can both use a pressure transducer 18 which is in communication with signal processing and control means or mechanism 20.

The control and processing means or mechanism 20 preferably comprises a computer 21. Pressure signals from the pressure transducer 18 are fed into the computer 21 where they are processed and analyzed. The computer 21 can include a video display 22 for displaying the pressure signals and a keyboard 23 for interacting with the computer 21. Digital filtering techniques permit sensitive detection with low false alarm rate. Detailed information on signal processing of the signal from the pressure transducer 18 can be found in "Pipeline Rupture Detection and Controls", M. T. Covington, ASME Publication 78-PET-54, incorporated by reference herein.

The signal processing and control means or mechanism 20, upon recognition of a wave signal indicative of a sudden release, controls the test wave creating mechanism 14 to release a wave of fluid into the pipeline 12. This test wave travels through the pipeline 12 and is eventually reflected by fluid distributors within the pipeline 12. The reflected wave is sensed by the reflection detecting mechanism.

In a preferred embodiment, the test pressure wave creating mechanism 14 comprises an accumulator 24 for providing a charge of fluid to the pipeline 12. The charge is released upon opening of valve 65 controlled by the processing and control means or mechanism 20. Preferably, there is also a mechanism 26 for pressurizing the accumulator 24 with fluid. The pressurizing means or mechanism 26 can comprise a pump 28 which is in communication with the fluid in the pipeline 12.

It should be appreciated that the test wave reflection represents a mapping of the inside of the pipeline 12. Various, inlets, outlets and geometry features can be detected with the reflection wave. Each of these features partially reflects some of the test wave energy. By comparing test wave reflection with a previously taken signature reflection of the pipeline 12, a release and its location can be determined.

Thus, the present invention is also a system 100 for mapping a pipeline 12. The system 100 comprises a mechanism 14 for creating a test pressure wave within a pipeline 12. The system 100 also comprises a mechanism for detecting a reflection wave of the test pressure wave. The detecting mechanism can be a pressure transducer 18 and signal processing means or mechanism 20 which process the pressure signal over time.

Figure 2A:
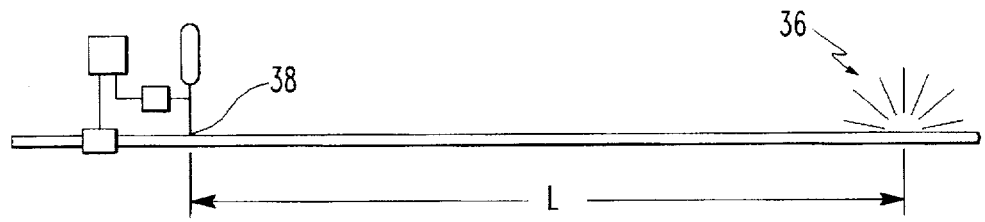
FIGS. 2a–2d illustrate wave propagation toward and away from a leak in the pipeline.
Figure 2B:
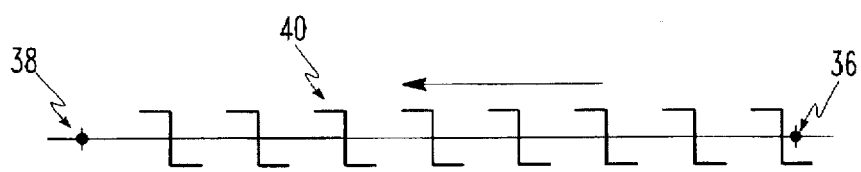

In the operation of the system 10, the signal processing and control means or mechanism 20 continuously monitor pipeline pressure to observe discontinuities in pipeline pressure caused by a sudden release of pressure, such as a leak or an offtake. As represented in FIG. 2a, when a sudden release 36 occurs from the pipeline 12, there is an instantaneous change from one steady state of pressure to a lower state. As shown in FIG. 2b, this damage creates a negative plane wave 40. This wave 40 travels, in both directions away from the release point 36 through the fluid in the pipeline 12 and at the speed of sound (celerity) of the fluid. The system 10 is located at one end of a pipeline 14 or section of line under scrutiny. The control and processing means or mechanism 20 is configured to observe, via the pressure transducer 18, the negative pressure wave 40 as it passes the monitor point 38.

On observing a negative pressure wave 40 that is indicative of a new release, the system 10 starts a data logging program of the control and processing means or mechanism 20. A fast acting solenoid valve 25 is opened. Opening of this valve releases a high pressure charge, from a precharged accumulator 24 into the pipeline 12.

The accumulator is precharged by opening valves 41, 42 and 43 to balance pressure from the line 12 into the accumulator 24 (valve 25 is closed at this time). Then, valve 42 is closed and by use of pump 28, the pressure in the accumulator 24 is raised to a level of 200–400 psi above line pressure. Valves 41 and 43 are then closed.

Figure 2C:
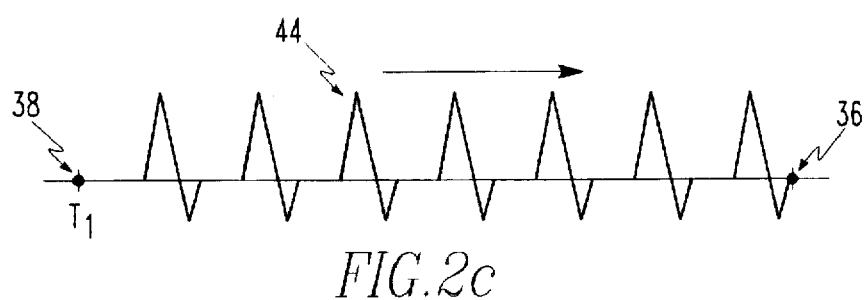
Figure 2D:
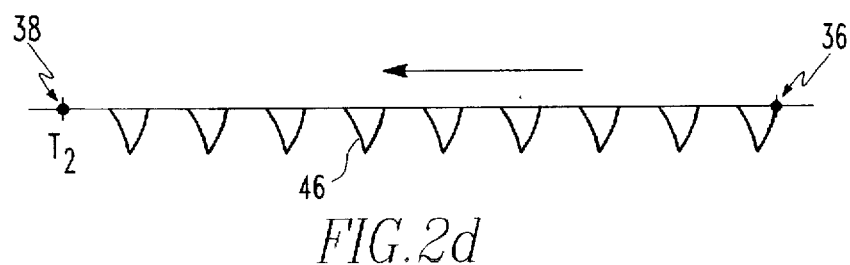

As shown in FIG. 2c, the high pressure charge creates a positive pressure wave 44 which travels, at the celerity of the fluid through the pipeline away from the monitoring point 38. When the positive wave 44 passes the release point 36, part of the energy of the positive wave 44 is reversed and a detectable negative wave front reflection 46 is generated. As shown in FIG. 2d, this negative wave front 46 then travels through the fluid, again at the celerity of the fluid in both directions away from the release point 36.

When this negative wave 46 passes, the monitor point its magnitude and time of arrival are noted by the control and processing means or mechanism 20. The control and processing means or mechanism, having previously noted the time of initiation of the positive pressure wave, calculates the time difference $(T_1-T_2)$ between the positive initiation and the arrival of the negative reflection.

Knowing this time difference $(T_1-T_2)$ and the celerity of the fluid, the distance, L, to the release 36 from the monitor point 38 can be established. The system 10 includes an ultrasonic device 19 that continuously monitors the density of the fluid. From this density, reading the celerity at the time of initiation of the wave 44 is known. The ultrasonic device 19 can be as described in patent application Ser. No. 07/957,411, incorporated by reference herein.

$$L = \text{celerity} \times (T_1-T_2)/2$$

Knowing the total time difference $(T_1-T_2)$ in seconds from the initiation, at the monitor point 38 of the positive wave 44 to the arrival of the monitor point 38 of the negative reflection 44, and by multiplying this time by the celerity (in feet per second) the total distance that the two waves 44, 46 (positive and negative reflection) have travelled is known. By dividing this total distance by two, the distance, L, of the release from the monitor point 38 (in feet) is established.

Figure 4A:
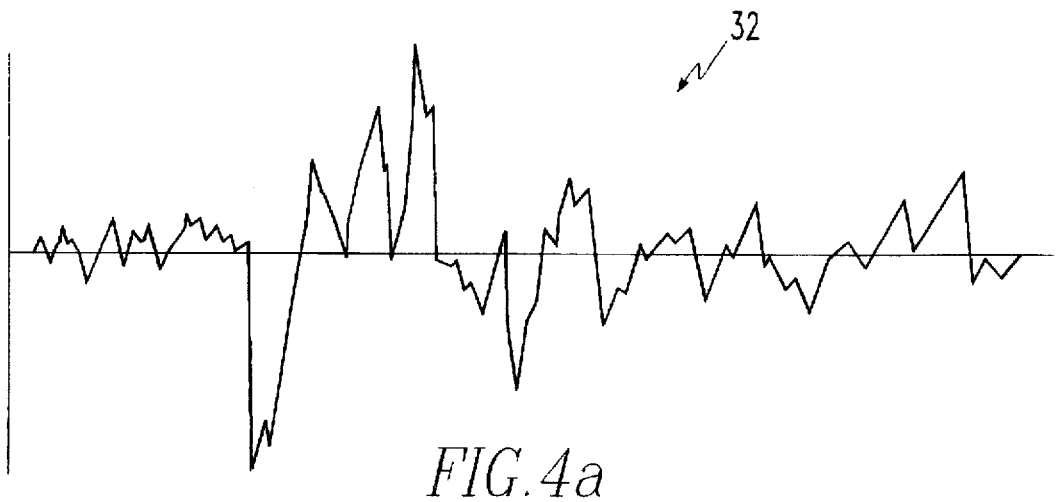
FIG. 4a is a wave signal representing a signature mapping of the pipeline.
Figure 4B:
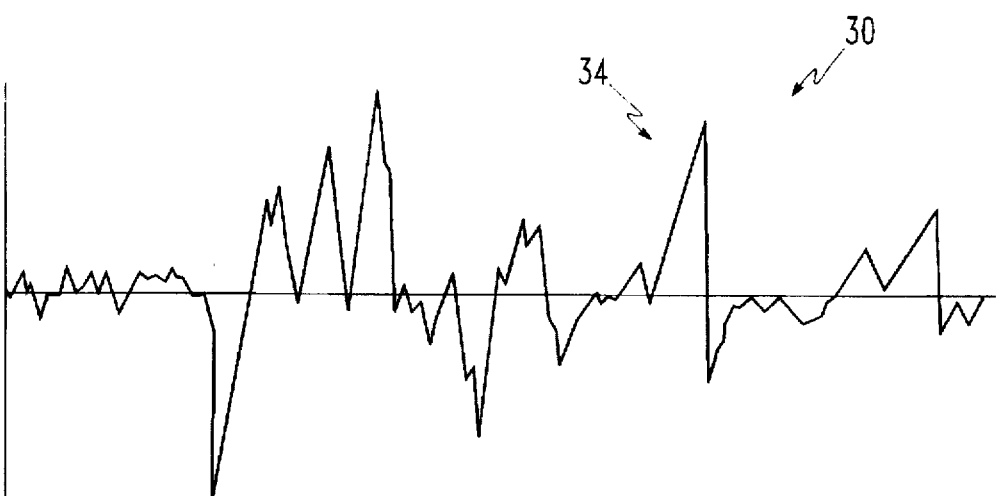
FIG. 4b is a wave signal having a portion indicative of a fluid release in the pipeline.

An example of a reflection 30 of the test wave signal is shown in FIG. 4b. The reflection is analyzed by the processing and control means or mechanism 20 and compared with a signature test wave reference reflection 32 as shown in FIG. 4a. The signature reflection 32 is particular to a specific pipeline 12. It is characterized by the geometrical parameters of the pipeline 12 and the particular output and input junctions. (By creating just the signature reflection reference reflection 32, the pipeline 12 is mapped. Each particular output or input junction in the pipe produces a reflection to the test wave which identifies it and its relative location.) Any outflow (or inflow) new to the pipeline 12 since the collection of the signature test wave shows up as a portion 34 which is different from that of the signature test wave reflection 32. Detection of the portion 34 can be manual or automatic. The time the portion 34 passes monitoring point 38 is used to calculate distance, L, to the release.

In order to determine an accurate location of the release an accurate reading of the real-time celerity must be taken. For example, the celerity of oil as an infinite medium at 60° (f) is ≈4100 ft./sec. However, in a pipeline 12, the celerity is reduced by elasticity E of the pipeline.

$$C_p(T) = \frac{C(T)}{1+\frac{D}{t}\frac{B}{E}}$$

where:

$C_p(T)$=celerity of fluid in pipeline $C(T)$=celerity of fluid in an infinite medium
$D$=outer diameter of pipe
$t$=wall thickness of pipe
$B=C^2\rho_w/g$
$\rho_w$=density of fluid
$g$=gravity
For a 6" pipe rated at 1200 psi:
OD=6.625=(outer diameter)
$t$=0.280 in.
$E=30\times10^6$ psi
SG=Specific Gravity
$\rho_w$=SG×62.4=50.88 lb/in$_2$
$g$=32.2 ft/sec$^2$ $$B=50.88/33.2\times(4100)^2=26.57\times10^6\times\#/FT^2=184,500 \text{ psi}$$

Therefore:

$$C_p(T)=C(T)1/\sqrt{1+6.625 \ 184,500/0.28\times30,000,000}$$

$C_p$=(0.934) C(t)
$C_p$=3830 ft./sec.
Taking account of temperature $$C(\text{temp})=4502-6.7*T$$

The effective sound velocity considering pipe elasticity is:

$$C_p(\text{temp})=0.934* C(\text{temp})$$

or $$C_p(\text{temp})=0.934* (4502-(6.7*T)=4205-(6.258*t)$$

TABLE 1

| Effective Sound Velocity Cp (Ft/Sec) | Temperature (DegF) |
|---|---|
| 3955 | 40 |
| 3892 | 50 |
| 3830 | 60 |
| 3767 | 70 |
| 3704 | 80 |
| 3642 | 90 |
| 3579 | 100 |
| 3517 | 110 |
| 3454 | 120 |

Figure 3:
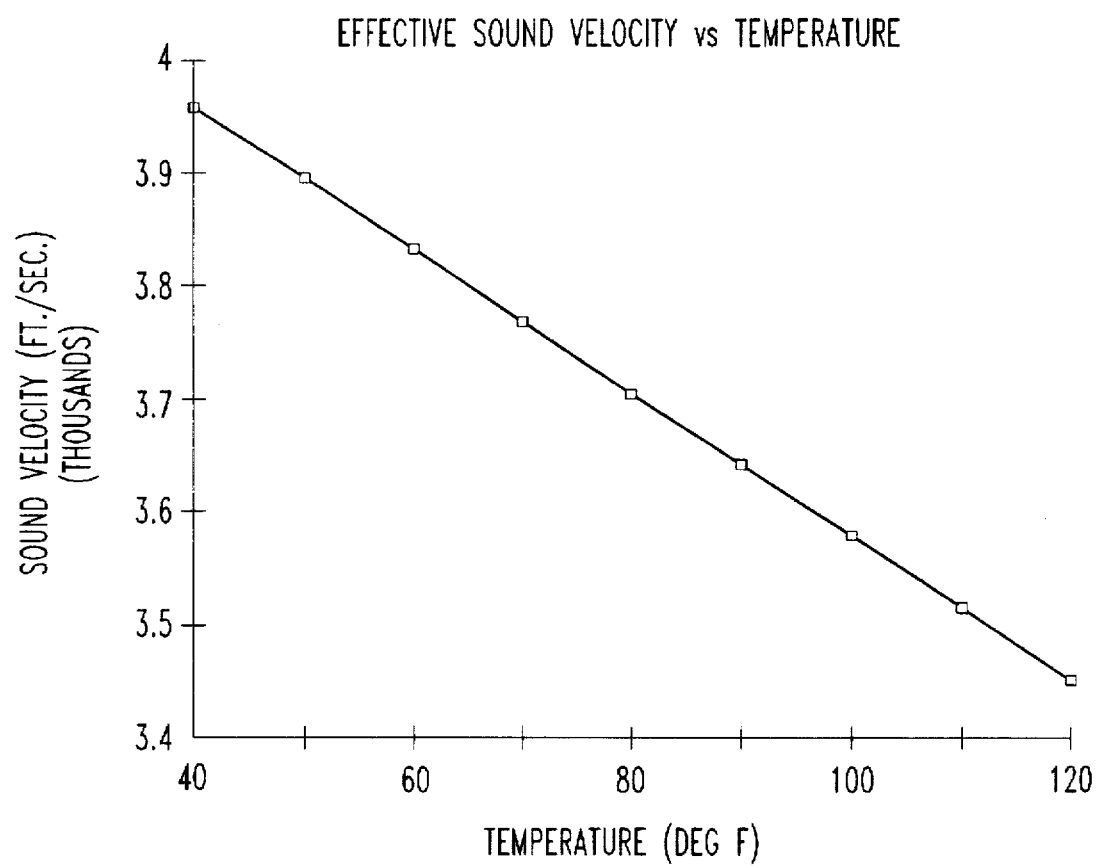
FIG. 3 is a graph showing the effective velocity of sound in the fluid in the pipeline relative to temperature.

The numbers of Table 1 are illustrated in figure 3. (Instead of ultrasonic device 19, a table look-up can be used, for instance, such as Table 1, for the appropriate material.)

The distance, L, to the release is determined from the transit time of the reflection as follows:

$$L=(Cp*T_2-T_1/2)/5280$$

Where:
L=Distance to the Leak in miles
Cp=Effective Sound Velocity for the present fluid temperature in feet/sec.
time=Total transit time of the reflected pressure wave (from the test pressure wave source to the leak and back to the transducer 18)

As an example:
Given:
1) 80 deg fluid
2) Reflection time of 35 seconds
L=(3704*35)/(2*5280)=12.26 miles
[Cp(T) can also be found from FIG. 3]

The system 10 is preferably a single point system for determining the location of a release of fluid from a pipeline 12 or a section of a pipeline. In determining the location of a release from a pipeline 12, a number of procedures are carried out in a predetermined period of time.

Figure 5:
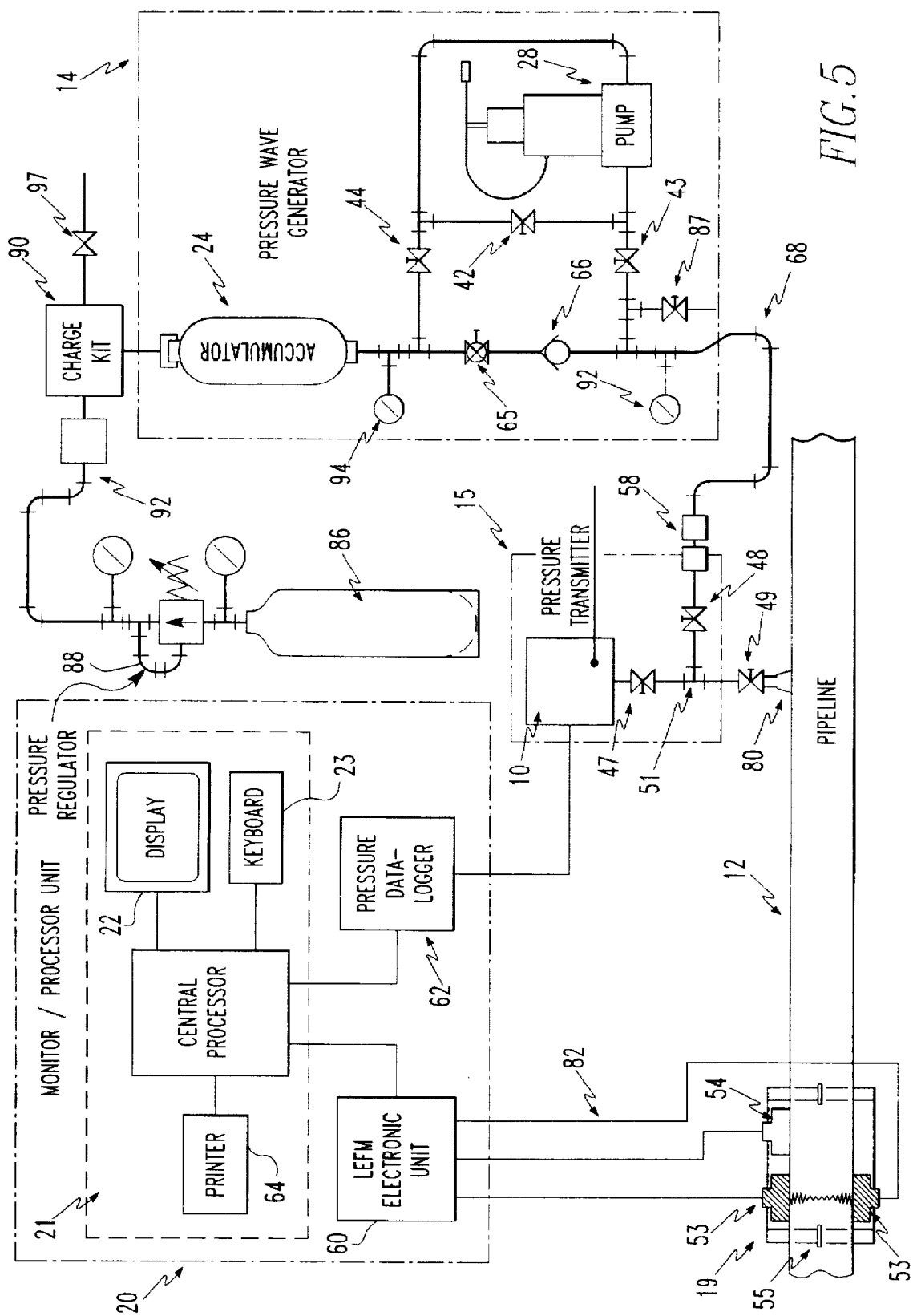
FIG. 5 is a schematic representation showing one embodiment of the system for locating release of fluid from a pipeline.

In one embodiment of the invention, the system 10 is comprised of a number of portable interconnecting sub-assemblies as shown in FIG. 5. These portable sub-assemblies are the single path external transducer assembly 19, pressure transmitter assembly 15, monitor/processor unit 20 and pressure wave generator 14.

Each sub-assembly is described as follows. The single cross-path transducer assembly 19 consists of a pair of ultrasonic transducers 53, a resistance temperature detector 54 (RTD) and a mounting fixture 55. The pressure transmitter assembly 15 consists of a pressure transducer/transmitter 18 to be mounted on to a permanently installed pipeline tap 80. The pressure transmitter 18 can also comprise three shut-off valves 47, 48, 49, a tee fitting 51 and a quick connect valve body 58.

The monitor/processor unit 20 preferably consists of three primary elements. An LEFM electronic unit 60, a pressure data logger 62 and a central processor and display unit 21. The LEFM electronic unit 60 is an industrial quality computer configured to receive and process data from the ultrasonic transducers 53 and resistance temperature detector 54 (RTD). From this data, the electronic unit 60 determines the sound velocity (celerity) of the medium in the pipeline 12 and establishes the average sound velocity over the predetermined period set for the leak location procedures to be completed. Detailed information on the operation of the LEFM electronic unit 62 can be found in U.S. patent application Ser. No. 07/957,411, incorporated by reference herein.

The pressure data logger 62 is an industrial quality computer configured to receive and process data from the pressure transmitter 18. The data logger 62 records the pressure data in digital form and notes and records the time of arrival of all pressure events at the measurement point.

The central processor and display unit 21 is an industrial quality computer configured to process sound velocity data received from the LEFM electronic unit 60 and pressure event and time data from the pressure data logger 62. The computer 21 calculates and displays on an integral VGA monitor 22 the location and approximate magnitude of any leaks or unauthorized take-offs from the section of line that is under surveillance. A printer 64 is included to provide a permanent record of the pipeline surveillance results.

The pressure wave generator 14 consists of a precharged bladder type accumulator 24 that connects to the pressure transmitter assembly 15 via a release valve 65, check valve 66 and high pressure hose assembly 68. In parallel with the release valve 65 is a pump 28, two isolation valves 44, 44, and a by-pass valve 42 to provide a means or mechanism to transfer pipeline product into the accumulator 24 and to pressurize the product within the accumulator 24 to a predetermined level above a pipeline pressure.

The following is the procedure for the installation of the system 10 onto a pipeline 12.

A section of pipeline 12 is determined as requiring investigation for the presence of an existing leak or unauthorized take-off. One end of the section is selected as the measurement location. At this location, there will be a line tap 80 installed. The line tap 80 will consist of a weldolet or threadolet with an isolation valve 49 to permit access to the pipeline medium.

The single path external transducer assembly 60 is mounted onto the outside of the pipeline 12 adjacent to the line tap 80. Each transducer 53 is connected, via transducer cables 82, to the appropriate port of the LEFM electronic unit 50 contained in the monitor/processor unit 20.

With valve 49 closed, the pressure transmitter assembly 15 is connected onto the line tap 80. The pressure transmitter 18 is connected, via transmitter cable 83 to the data entry port of the pressure data logger 62 and the pressure connection is made via a high pressure hose 68 and quick-connect stem to the pressure wave generator 14.

The following serves as directions of the operation of the system:

Procedure 1

Precharge the bladder type accumulator 24 located on the pressure wave generator 14. To accomplish this, use a standard nitrogen bottle 86 fitted with a pressure regulator assembly 88. Remove the protective cover located at the top of the pressure accumulator 24 and connect the charging kit 90 to the exposed charging port. With a high pressure hose 92, connect the outlet of the pressure regulator 88 to the inlet port of the charging kit 90. Open the bleed-off valve 97 on the charging kit by a half turn. Ensure the regulator adjustment screw is fully backed out (regulator closed) and then open the nitrogen bottle isolation valve. Turn in the adjustment screw of the pressure regulator 88 (nitrogen will escape from the bleed valve 97) until the outlet gauge on the regulator 88 reads 400 psi then close the charging kit bleed valve. Turn in the lifting valve on the charging kit until it is all the way down. The pressure reading on the regulator outlet gauge will fall indicating that nitrogen is flowing between the bottle 86 and the accumulator 24. When the pressure reading has stabilized back to 400 psi charging is complete. Back up the lifting valve of the charging kit 90 until it is all the way up. Close the nitrogen bottle isolation valve and open the charging kit bleed valve 97 to release any pressure contained between the charging kit 90 and the nitrogen bottle 86. Disconnect the high pressure hose 92 from charging kit 90 and from the pressure regulator 88 and replace the protective cover onto the accumulator 24. The accumulator 24 is now precharged.

Switch the power on to the monitor/processor unit 20. The system will display a data entry screen on the display 22. At the appropriate prompt, shown on the display screen, enter the pipeline data (line diameter, wall thickness, etc.). Calculated sound velocity will be continuously displayed in feet per second.

Open pipeline valve 49 and valve 48 of pressure transmitter assembly 15. Crack open drain valve 87 to release any air trapped in the high pressure hose 68. Ensure an adequate container is available as pipeline product will be released when valve 87 is opened. When air is out of the system, close valve 87.

Procedure 2

Ensure release valve 65 is closed and open valves 43, 44 and 65 to equalize pressure across the pump 28. Pipeline pressure will be shown on both pressure gauges 92, 94. Close valve (D) 42 and operate pump 28 until the reading on pressure gauge 94 is higher than than that pressure gauge 92 by a predetermined amount. The pressure differential between the pipeline 12 and the accumulator 24 should be in the order of 200 to 400 psi. The greater the differential, the more effectively the system 10 will function but care should be taken to ensure that the pressure in the accumulator 24 is not higher than the maximum allowable working pressure (MAWP) of the pipeline 12.

Enter the appropriate command (logp) to access the data-logger. Enter an appropriate file name—eight digits max+.dat (ABCD1234.dat). Select a time period for the location procedure (in minutes) of sufficient duration to allow a pressure wave, travelling at the sound velocity displayed, to transit the entire length of the pipeline section by dividing the pipeline length (in feet) by the displayed sound velocity, double this time (to allow any reflected wave to transit back to the monitor point) and multiply by a tolerance factor.

Example

Pipeline section length=25 miles or 132,000 ft.
Calculated Sound Velocity=3600 ft/sec.
Tolerance Factor=3
132,000÷3600=36.666 sec (transit time in seconds)
36.66×2=73.33×3=219.99 secs
Select 4 minutes (240 secs) this being the next full min. above 219 secs On entering the selected time the data-logger 62 will commence receiving pipeline pressure data. At an appropriate time mark (approximately 30 secs after entering time) snap open release valve 65. At the end of selected time the data-logger 62 will automatically stop receiving pressure data.

Select pressure data display program that is in the data-logger (algordsp). See U.S. patent application Ser. Nos. 07/962,524, 07/962,526 and 07/962,457. Select the file name (ABCD1234.dat). The pressure profile and time reference will be displayed on the monitor screen 22. Scroll thru the pressure profile data until the positive wave (seen as commencing at approximately 30 secs) is in center of screen, align the cursor with the extreme top of the wave shape (i.e. at the highest pressure value displayed at the top of the screen). Note the time displayed as time "A".

As the positive, induced wave travels through the pipeline section under investigation the energy of the wave is altered by the change of pipeline cross-section associated with devices such as check-valves, block-valves, and control valves. The location of these type of devices is known and should be noted before the commencement of a leak determining procedure. The wave energy is also altered by the change of the steady state of pipeline pressure associated with a release of product into a take-off or through a leak. As the energy of the pressure wave is altered a negative pressure or reflection wave is created. These negative wave reflections also travel through the pipeline medium and at the sound velocity of the medium.

Continue to scroll thru the pressure profile data and observe for wave reflections, align the cursor with the extreme bottom of the reflected wave shape (i.e. at the lowest pressure value display at the top of the screen). Note the time displayed as time "B". If a number of wave reflections are observed then note them as "B1", "B2", "B3", etc.

Exit the pressure data display program. The system will default to the data entry screen. At the appropriate prompt, enter time "A" i.e. xxx.xxx secs. At the appropriate prompt enter time "B" or times "B1", "B2", "B3", etc. When all times are entered then enter the "location calc." command. The location will be displayed for each reflection generating source.

i.e. "B1"=xx,xxx ft.
"B2"=x,xxxx ft.
"B3"=xxx,xxx ft.

Compare these locations with those of the known devices. If there is a correlation then it will be known that the reflection was generated by that corresponding device. Any locations noted that do not have a corresponding known location should be investigated as being a leak or unauthorized take-off.

Repeat procedure 2 at least twice more and establish the average location of a leak or unauthorized take-off event before commencing an investigation. The more procedures carried out the more accurate the average location will be.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A system for locating release of fluid in a pipeline comprising:

means or a mechanism for detecting a pressure wave within the fluid from the fluid itself indicative of a release of fluid from the pipeline; and means or a mechanism for determining a location of the release of fluid in the event of a detected pressure wave by the detecting means or mechanism within the fluid from the fluid itself that is indicative of a fluid release by creating a test pressure wave within the fluid which reflects from the pressure wave source and is received.

2. A system as described in claim 1 wherein the determining means or mechanism comprises a mechanism for creating a test pressure wave within the fluid in the pipeline and a mechanism for detecting a reflection of the test pressure wave.

3. A system as described in claim 2 wherein the determining means or mechanism comprises control and processing means or mechanism, said control and processing means or mechanism calculating the location of the release of fluid based on time elapsed between initiation of the test pressure wave and detection of the reflection.

4. A system as described in claim 3 wherein the control and processing means or mechanism comprises means or mechanism for measuring speed of wave propagation in the fluid, said measuring means or mechanism disposed adjacent to the pipeline.

5. A system as described in claim 4 wherein the pressure detecting means or mechanism and the reflection detecting mechanism comprise a pressure transducer in fluidic communication with the pipeline.

6. A system as described in claim 5 wherein the test pressure wave creating mechanism comprises an accumulator for providing a pressurized charge of fluid to the pipeline, said accumulator having a valve and in fluidic communication with the pipeline, said valve in communication with the control and processing means or mechanism.

7. A system as described in claim 6 wherein the test pressure wave creating mechanism comprises means or mechanism for pressurizing the accumulator with fluid.

8. A system as described in claim 7 wherein the processing and control means or mechanism comprises a computer.

9. A system as described in claim 8 wherein the processing and control means or mechanism comprises a video monitor and keyboard.

10. A method for locating release of fluid in a pipeline comprising the steps of:

detecting a pressure wave in the fluid from the fluid itself indicative of a release of fluid from the pipeline;

creating a test pressure wave in the fluid so it propagates in the fluid to a location of the release of fluid; and determining the location of the release of fluid based on time elapsed between initiation of the test pressure wave and reception of a reflection of the test pressure wave from the location of the release of fluid.

11. A method as described in claim 10 wherein before the detecting step, there is the step of obtaining a signature wave profile of the pipeline.

12. A method as described in claim 11 wherein before the determining step, there is the step of measuring speed of wave propagation in the fluid.

13. A method as described in claim 12 wherein the creating step includes the step of injecting a charge of pressurized fluid into the pipeline.

14. A system for mapping a pipeline comprising:

a mechanism for creating a test pressure wave within a pipeline, said creating mechanism disposed in fluidic communication with fluid in the pipeline; and a mechanism for detecting reflections of the test pressure wave in the fluid in the pipeline, said detecting mechanism having signal processing means or mechanism for generating a wave signal corresponding to a mapping of the pipeline, said detecting mechanism disposed in fluidic communication with fluid in the pipeline.

15. A system as described in claim 14 wherein the pressure detecting means or mechanism and the reflection detecting mechanism comprise a pressure transducer in fluidic communication with the pipeline.

16. A system as described in claim 5 wherein the test pressure wave creating mechanism comprises an accumulator for providing a charge of fluid to the pipeline, said accumulator having a valve and in fluidic communication with the pipeline, said valve in communication with the control and processing means or mechanism.

17. A system as described in claim 8 wherein the processing and control means or mechanism comprises a video monitor and keyboard.

* * * * *